United States Patent [19] [11] 4,405,375
Gibson et al. [45] Sep. 20, 1983

[54] NIYUMINOUZBITUMINOUS EMULSION ROOF RESATURANT

[75] Inventors: Richard J. Gibson, North Olmstead; Joseph Fogel, University Heights, both of Ohio

[73] Assignee: The B. F. Goodrich Company, Akron, Ohio

[21] Appl. No.: 151,869

[22] Filed: May 21, 1980

[51] Int. Cl.³ .............................................. C08L 95/00
[52] U.S. Cl. .................................. 106/277; 252/311.5
[58] Field of Search ...................... 106/277; 252/311.5

[56] References Cited

U.S. PATENT DOCUMENTS 2,941,893 6/1960 McConnaughay ................. 106/277
3,266,922 8/1966 Cummings et al. ................. 106/277
3,753,752 8/1973 Pitchford ............................. 106/277

Primary Examiner—Lorenzo B. Hayes
Assistant Examiner—Amelia B. Yarbrough
Attorney, Agent, or Firm—James R. Lindsay

[57] ABSTRACT

A bituminous emulsion roof resaturant for application over an existing roof surface to rejuvenate the roof system is provided. The roof resaturant has an oil phase that is comprised of a bitumen and aromatic hydrocarbons. The oil phase is suspended as droplets or discrete particles in a water phase that contains an emulsifier and up to 2.0 parts by weight of glyoxal per 100 parts by weight of water in the water phase.

5 Claims, No Drawings

NIYUMINOUZBITUMINOUS EMULSION ROOF RESATURANT

BACKGROUND OF THE INVENTION

The present invention is directed to a bituminous emulsion roof resaturant for application to weathered built-up roof systems.

In one typical roofing system for office and industrial buildings the roofing is a multi-component system that is applied directly to the roof deck, the roof deck normally consisting of a corrugated steel decking supported on roof trusses. The multi-component system usually includes one or more layers of an insulation material (such as glass fiber insulation board or a rigid foam insulation board) that is adhered to the roof deck. One or more asphalt- or tar-impregnated felt layers then are adhered on top of the insulation material. A sealant coating of an asphalt or tar is applied over the impregnated felt layers. A layer of gravel then is spread over the coating of asphalt or tar.

After a period of aging and exposure to the elements, the sealant coating becomes eroded, checked and cracked. The impregnated felt layers during this same period lose their flexibility and are susceptible to being rented when the roof system expands and contracts during normal changes in ambient temperature. The cracking and checking of the sealant coating and the rending of the impregnated felt layers destroy the watertight integrity of the roofing system allowing water to permeate the insulation layers of the roof structure and impede their insulating function. Various attempts have been made to make the roof system watertight once again, but they have not been entirely satisfactory.

One approach to providing a solution to this problem involves merely applying an additional sealant coating (after removal of loose gravel) of asphalt or tar over the old checked and cracked sealant coating. While such new sealant coating provides a temporary repair, the movement of the rented relatively still impregnated felt layers during expansion and contraction of the roofing system during temperature fluctuation once again causes cracks to reoccur in the sealant coating resulting in the destruction once more of the watertight integrity of the roofing system.

In another attempt to provide a solution to the problem, a glass fiber fabric layer is applied over the weathered surface of the roofing system (after removal of loose gravel) and one or more coats of "cutback" bitumen or a bitumen emulsion are coated over the glass fiber fabric to adhere the fabric to the weathered surface and to impregnate and seal the glass fiber fabric. However, the glass fiber fabric, while it bridges over the tears in the impregnated felt layers, does not follow the contour of the felt layer surface very closely nor fit into the cracks and crevices that are present in the weathered sealant coat. As a result, tiny voids and pinholes form as the roofing structure expands and contracts and the watertight integrity of the roofing system once more is breached.

SUMMARY OF THE INVENTION

The present invention provides a bituminous emulsion composition that is applied over a weathered roofing system (after removal of loose gravel) to impart not only waterproof integrity to the weathered roofing system, but also to rejuvenate significantly the impregnated felt layers of the roofing system by restoring much of their original suppleness. As a consequence, when the roofing system expands and contracts during normal temperature variations, the impregnated, now pliable, felt layers even though they are torn do not exhibit the strong tendency to rupture the supplemental sealing coat over the weathered roofing system, thereby prolonging the waterproof integrity of the roofing system.

The bituminous emulsion composition of the present invention can be considered to consist of two separate phases, namely, a water phase and an oil phase containing bitumen. The water phase contains an emulsifier and can be considered as the continuous phase of the emulsion with the oil phase existing in the form of small droplets or particles suspended in the water phase. The dispersion of oil phase droplets in the water phase of the composition is retained until the composition is applied to the weathered surface of the roofing system. As the emulsion dries the suspension of the oil phase droplets is destroyed and a continuous bituminous layer is formed.

Once the bituminous sealant coat has been formed over the weathered roofing system, the aromatic hydrocarbon "oils" in the sealant layer thus formed permeate through the weathered cracked and checked sealant coat of the roofing system and into the felt layers underneath. The "oils" resaturate the felt layers and return a condition of suppleness to the previously stiff felt layers. When the roofing system thereafter expands and contracts due to temperature changes, the felt layers, being pliable once again, are free to distort without causing an undue strain on the newly-applied sealant coat.

DETAILED DESCRIPTION OF THE INVENTION

As mentioned above, the bituminous emulsion roof resaturant of the present invention may be considered to consist of a water phase and a bitumen-containing oil phase, the water phase functioning as the continuous phase of the emulsion with droplets or discrete particles of the oil phase suspended within the water phase.

The water phase of the emulsion is comprised primarily of water but contains a sufficient amount of a hydroxypropoyl methylcellulose or a partially acetylated polyvinyl alcohol emulsifying agent or a combination thereof to maintain the droplets or particles of bitumen-containing oil phase suspended in the water phase. In addition to the water and emulsifying agent, the water phase also contains from about 0.1 to 2.0 parts by weight of glyoxal per 100 parts by weight of water. The water phase also may contain small amounts of other materials (such as clay, formaldehyde and propylene glycol) to impart specific desired properties to the composition.

The emulsifying agent in the water phase is either a hydroxypropyl methylcellulose or a partially acetylated polyvinyl alcohol or a combination of the two and maintains the droplets or particles of the oil phase suspended in the water phase of the composition. The amount of emulsifying agent present in the water phase can vary but should be present in a sufficient amount to maintain the bitumen-containing oil phase droplets or particles n suspension. Desirably the water phase of the composition contains about 0.5 to 2.0 parts by weight of the emulsifier per 100 parts by weight of water.

Clays serve the function as a thickener for the composition and as a humectant and, when used, may be considered to be a component of the water phase of the composition. Although the amount of clay which can be used can vary, desirably the composition does not contain over about 2.5 parts by weight of clay per 100 parts by weight of water in the emulsion composition.

A glycol, such as propylene glycol, can be included as a humectant and to provide freeze-thaw stability to the composition. Up to about 15 parts by weight of the glycol can be present for every 100 parts by weight of water in the composition.

Up to about one part by weight of a bactericide, such as formaldehyde, for every 100 parts by weight of water in the composition also can be added to the water phase of the composition.

The oil phase of the bituminous emulsion composition of this invention is comprised of a blend of bitumen and aromatic hydrocarbons. The bitumen component of the oil phase of the composition of this invention may be any bitumen material that has the following properties:

| | |
|---|---|
| Softening point (ASTM D36) | 32°–45° C. |
| Flash point (ASTM D92) | 260° C.+ |
| Penetration (50 gram load, 25° C.) (5 Sec.) (ASTM D5) | 30–170 |
| Ductility @ 25° C. (ASTM D113) | 50+ cm. |
| Solubility in carbon tetrachloride | 99% min. |
| Loss-in-heating @ 163° C. (ASTM D6) | 1% max. |

The bitumen constituent of the oil phase can be either a natural bitumen such as gilsonite or one obtained as a residue in refining petroleum.

The aromatic hydrocarbon constituent of the oil phase may be comprised of one or more aromatic hydrocarbon materials and preferably is obtained as a result of refining petroleum. Aromatic hydrocarbon materials useful in the bitumen-containing oil phase of the composition and derived from the refining of petroleum generally are classified as amorphous synthetic "resins" and bitumen "oils". A mixture of bitumen resins and oils may be used in the oil phase of the composition to impart the desired overall properties to the oil phase. The oil phase desirably has the following specifications:

| | |
|---|---|
| Load penetration (50 gram load, 25° C.) (5 sec.) (ASTM D5) | 75–350 |
| Softening point (ASTM D36) | 25–50° C. |
| Aromatic content (ASTM D-2007) | 50% min. |

Preferably the oil phase contains about 15 to 35 percent by weight of the bitumen component and about 65 to 85 percent by weight of aromatic hydrocarbons.

The water phase and the bitumen-containing oil phase of the composition are mixed separately and then are combined in a high shear mixer to form the emulsion composition. Desirably, the bitumen and aromatic hydrocarbons are charged into a jacketed vessel and heated to about 75° to 120° C. while being stirred under low shear conditions until a blend of the bitumen and aromatic hydrocarbons is realized. At the same time, the water, emulsifying agent, glyoxal and any other ingredients of the water phase are blended together. Preferably, the water, emulsifier and clay (if clay is used) initially are blended together in a low speed mixer and the remaining components of the water phase are then added with stirring. The water phase and oil phase then are combined, preferably in a high shear mixer.

Preferably, the bituminous emulsion roof resaturant composition contains from 50 to 70 percent by weight of the oil phase and from 30 to 50 percent by weight of the water phase. If desired, up to about 15 percent by weight of the composition may be a filler material, for example, chopped fiber glass of short length.

The bituminous emulsion roof resaturant can be applied (after loose gravel is removed from the weathered roof system) to the weathered roof surface by any convenient method such as by brushing, spraying, mopping or troweling the composition onto the surface. Desirably, a sealant coat about ¼ to ¾ cm. in thickness is applied over the weathered roof surface to restore a watertight integrity to the roof system.

The present invention is further illustrated by the following examples:

EXAMPLE I

A bituminous emulsion roof resaturant of the following formulation was formed.

| Material | Parts By Wt. |
|---|---|
| Bitumen* | 13.46 |
| Aromatic petroleum resin (CD-103)** | 43.47 |
| Light aromatic oil (Shell Dutrex 298)*** | 2.12 |
| Water | 36.49 |
| Hydroxypropyl methylcellulose (emulsifier) | 0.47 |
| Clay (sodium bentonite) | 0.90 |
| Glyoxal | 0.28 |
| Propylene glycol | 2.72 |
| Formaldehyde | 0.09 |
| TOTAL | 100.00 |

*100% bitumen composition having the following specifications:

| | |
|---|---|
| Specific gravity @ 15.6° C. | 955 |
| Flash point | 288° C.+ |
| Melting point | 49°–57° C. |
| Ductility @ 25° C. (ASTM D113) | 60 cm.+ |
| Heat loss @ °C. (ASTM D6) | 1% max. |
| Solubility in carbon tetrachloride | 99% min. |

**Aromatic resin obtained from petroleum and having the following specifications:

| | |
|---|---|
| Specific gravity @ 25° C. | 1.17 |
| Flash point | 255° C.+ |
| Softening point (ASTM D36) | 8° C. ± 5° C. |
| Penetration (100 gram load, 25° C.) (5 sec.) (ASTM D5) | 38 |
| Aromatics (wt. %) | 98 |

***Light aromatic hydrocarbon having the following specifications:

| | |
|---|---|
| Specific gravity @ 15.6° C. | 955 |
| Flash point | 174° C. |
| Polars (ASTM D-2007) (wt. %) | 10.0 |
| Aromatics (ASTM D-2007) (wt. %) | 77.2 |
| Saturates (ASTM D-2007) (wt. %) | 12.8 |
| Boiling Point @ 760 mm Hg | 288° C.+ |

12.26 parts by weight of the water of the composition and the clay were charged into a steam jacketed low speed mixer and were stirred for 12 hours at about 40°–45° C. The clay slurry was charged to a variable speed low shear mixer and the emulsifier and remainder of the water were added. The clay slurry, emulsifier and water were mixed together for 15 minutes and the glyoxal, propylene glycol and formaldehyde components were charged into the mixer and the contents were stirred for an additional 15 minutes to form the water phase of the composition.

The bitumen aromatic petroleum resin and light aromatic oil components of the composition were charged to a jacketed low-shear mixer and were blended together for 1 hour at about 90°–105° C. to form the oil phase of the composition. The oil phase had the following properties:

| | |
|---|---|
| Penetration (50 gram load, 25° C.) (5 Sec.) (ASTM D5) | 185 |
| Softening point (ASTM D36) | 36° C. |

The water phase and oil phase then were blended together in a high speed blender to produce the bituminuous emulsion product.

The bituminous emulsion product was brushed onto a weathered roof system built-up of impregnated felt layers coated with a sealant coat that had become eroded, checked and cracked. The impregnated felt layers of the roof system had become stiff and brittle due to aging. Upon drying, the bituminous emulsion product applied over the weathered roof system had formed a watertight sealant coat. After the sealant coat has been "down" for 4 weeks, the felt layers of the roof system had regained a marked degree of their original suppleness.

EXAMPLE II

A bituminous emulsion roof resaturant of the following formulation was formed.

| Material | Parts By Wt. |
|---|---|
| Bitumen* | 12.50 |
| Aromatic petroleum resin** | 46.70 |
| Light aromatic oil*** | 3.20 |
| Water | 32.77 |
| Partially acetylated polyvinyl alcohol (emulsifier) (Vinol 523) (87–89% hydrolysis) | 0.62 |
| Clay (sodium bentonite) | 0.65 |
| Gloxyal | 0.31 |
| Ethylene glycol | 3.10 |
| Formaldehyde | 0.15 |
| TOTAL | 100.00 |

*100% bitumen composition having the same specifications as the bitumen composition used in Example I.
**CD-103
***Shell Dutrex 298

11.80 parts by weight of the water of the composition and the clay were stirred together for 12 hours at about 40°–45° C. in a steam jacketed low speed mixer. The emulsifier and remainder of the water of the composition were combined with the clay slurry in a variable speed low shear mixer and were mixed together for 15 minutes, after which the glyoxal, ethylene glycol and formaldehyde were charged into the mixer and the contents were mixed for 12 minutes to form the water phase of the composition.

The oil phase of the composition comprising the bitumen, aromatic petroleum resin and light aromatic oil was formed in the same manner as the oil phase of Example I.

The water phase and oil phase then were blended together in a high speed blender to produce the bituminous emulsion product which can be applied to a weathered roof surface to improve its watertight integrity.

EXAMPLE III

A bituminous emulsion roof resaturant having the same formulation as that of Example II except that the emulsifier component consisted of 0.38 parts by weight of a partially acetylated polyvinyl alcohol emulsifier (Vinol 523, 87–89% hydrolysis) and 0.14 parts by weight of hydroxypropyl methylcellulose was formed in the same manner as the product of Example II. The product when applied to a weathered roof surface improves the watertight integrity of the roof system.

We claim:

1. A bituminous emulsion roof resaturant for application over an existing roof surface, said bituminous emulsion roof resaturant comprising a water phase and an oil phase suspended in particulate form in said water phase, said water phase containing:
   (a) water,
   (b) an emulsifier selected from the group consisting of hydroxypropyl methylcellulose, a partially acetylated polyvinyl alcohol or a combination of hydroxypropyl methylcellulose and a partially acetylated polyvinyl alcohol, and
   (c) from about 0.1 to 2.0 parts by weight of glyoxal per 100 parts by weight of water,
said oil phase comprising a blend of bitumen and aromatic hydrocarbons with at least 50 percent by weight of said blend being aromatic hydrocarbons, said bitumen having a load penetration measured according to ASTM Designation D5 with a 50 gram load at 25° C. for 5 seconds of from 30 to 170, a softening point measured according to ASTM Designation D36 of from 32° C. to 45° C., a flash point measured according to ASTM Designation D92 above 260° C., ductility at 25° C. measured according to ASTM Designation D113 in excess of 50 centimeters, solubility in carbon tetrachloride of at least 99 percent, and a maximum heat loss measured at 163° C. according to ASTM Designation D6 of one percent, said roof resaturant comprising from 50 to 70 percent by weight of said oil phase and from 30 to 50 percent by weight of said water phase.

2. The bituminous emulsion roof resaturant of claim 1 in which said water phase contains from 0.5 to 2.0 parts by weight of said emulsifier per 100 parts by weight of water.

3. The bituminous emulsion roof resaturant of claims 1 or 2 in which said oil phase comprises from 15 to 35 percent by weight of said bitumen and from 65 to 85 percent by weight of said aromatic hydrocarbons.

4. The bituminous emulsion roof resaturant of claim 3 in which said oil phase has a load penetration when measured pursuant to ASTM Designation D5 with a 50 gram load at 25° C. for 5 seconds of from 75 to 350 and has a softening point when measured pursuant to ASTM Designation D36 of from 25° to 50° C.

5. The bituminous emulsion roof resaturant of claim 2 in which said water phase contains up to 2.5 parts by weight of clay per 100 parts by weight of water, up to 15 parts by weight of propylene glycol per 100 parts by weight of water, and up to 1 part by weight of formaldehyde per 100 parts by weight of water.

* * * * *

UNITED STATES PATENT AND TRADEMARK OFFICE
CERTIFICATE OF CORRECTION

PATENT NO. : 4,405,375
DATED : September 20, 1983
INVENTOR(S) : Richard J. Gibson et al.

It is certified that error appears in the above-identified patent and that said Letters Patent is hereby corrected as shown below:

Title of invention should read

-- BITUMINOUS EMULSION ROOF RESATURANT --.

Signed and Sealed this

Sixth Day of December 1983

[SEAL]

Attest:

GERALD J. MOSSINGHOFF

*Attesting Officer*  *Commissioner of Patents and Trademarks*